US008021075B2

(12) United States Patent
Valentini et al.

(10) Patent No.: US 8,021,075 B2
(45) Date of Patent: Sep. 20, 2011

(54) CAPPED AND/OR BEVELED JET BLAST RESISTANT VEHICLE ARRESTING UNITS, BED AND METHODS

(75) Inventors: Silvia C. Valentini, West Chester, PA (US); Graham Kent Thompson, Jr., Media, PA (US); Yijian Shi, Swedesboro, NJ (US); Hugh Kenneth DeLong, III, Jeffersonville, PA (US); Randall Craig Ohneck, West Chester, PA (US); Richard David Angley, Aston, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 644 days.

(21) Appl. No.: 11/784,314

(22) Filed: Apr. 6, 2007

(65) Prior Publication Data

US 2008/0247819 A1 Oct. 9, 2008

(51) Int. Cl.
*E01C 5/22* (2006.01)
(52) U.S. Cl. ............. 404/39; 404/34; 188/371; 188/376
(58) Field of Classification Search ............... 244/110 E, 244/110 R; 404/10, 34, 71, 39; 188/371, 188/376; 52/596
See application file for complete search history.

(56) References Cited

U.S. PATENT DOCUMENTS

| 2,380,105 | A |  | 7/1945 | Gerrard |  |
|---|---|---|---|---|---|
| 3,066,896 | A |  | 12/1962 | Schirtzinger |  |
| 3,572,465 | A |  | 3/1971 | Olson |  |
| 3,867,159 | A |  | 2/1975 | Ergene |  |
| 4,007,917 | A |  | 2/1977 | Brubaker |  |
| 4,352,484 | A | * | 10/1982 | Gertz et al. | 256/13.1 |
| 4,939,037 | A |  | 7/1990 | Freeman et al. |  |
| 5,002,620 | A | * | 3/1991 | King | 156/153 |
| 5,124,196 | A |  | 6/1992 | Figge, Sr. |  |
| 5,193,764 | A | * | 3/1993 | Larratt et al. | 244/110 R |
| 5,607,252 | A |  | 3/1997 | Tischer |  |
| 5,620,276 | A |  | 4/1997 | Niemerski et al. |  |
| 5,746,537 | A | * | 5/1998 | Kellas et al. | 404/6 |
| 5,789,681 | A |  | 8/1998 | Angley et al. |  |
| 5,885,025 | A | * | 3/1999 | Angley et al. | 404/27 |
| 5,902,068 | A | * | 5/1999 | Angley et al. | 404/34 |
| 6,174,587 | B1 | * | 1/2001 | Figge, Sr. | 428/178 |
| 6,183,835 | B1 |  | 2/2001 | Cho et al. |  |
| 6,257,802 | B1 |  | 7/2001 | Vosbikian |  |
| 6,685,387 | B2 | * | 2/2004 | Allen et al. | 404/10 |
| 6,726,400 | B1 | * | 4/2004 | Angley et al. | 404/27 |
| 6,941,720 | B2 | * | 9/2005 | DeFord et al. | 52/783.14 |
| 6,971,817 | B2 | * | 12/2005 | Allen et al. | 404/10 |

(Continued)

FOREIGN PATENT DOCUMENTS

GB 1282103 7/1972
WO WO 98/35099 8/1998

(Continued)

OTHER PUBLICATIONS

U.S. Appl. No. 11/784,250, filed Apr. 6, 2007, Valentini.

(Continued)

*Primary Examiner* — Gary S Hartmann
(74) *Attorney, Agent, or Firm* — Dean W. Russell; Kilpatrick Townsend & Stockton LLP

(57) ABSTRACT

Aircraft arresting beds at ends of runways may be subject to damaging effects of jet blast phenomena. Arresting units for that and other applications and which are resistant to such effects are described, with related methods.

6 Claims, 8 Drawing Sheets

U.S. PATENT DOCUMENTS

| | | | |
|---|---|---|---|
| 7,261,490 B2 | 8/2007 | Allen et al. | |
| 7,371,029 B2 * | 5/2008 | Rogers et al. | 404/7 |
| 7,597,502 B2 * | 10/2009 | Allen et al. | 404/10 |
| 2008/0014019 A1 | 1/2008 | Allen et al. | |

FOREIGN PATENT DOCUMENTS

| | | |
|---|---|---|
| WO | WO-0229180 | 4/2002 |
| WO | WO 03/022682 A1 | 3/2003 |
| WO | WO-2008154062 | 12/2008 |
| WO | WO-2008154062 A3 | 12/2008 |

OTHER PUBLICATIONS

'Innovative Financing Backs Highway Project,' Civil Engineering, Civil Engineering ASCE, New York, New York, vol. 68, No. 10, Oct. 1, 1998, one page XP000788446.

International Search Report and Written Opinion in related Serial No. PCT/US2008/059348 mailed Feb. 23, 2009.

'Cellular Concrete Stops Airplanes in Their Tracks' *Civil Engineering* Oct. 1998, pp. 14, 16.

\* cited by examiner

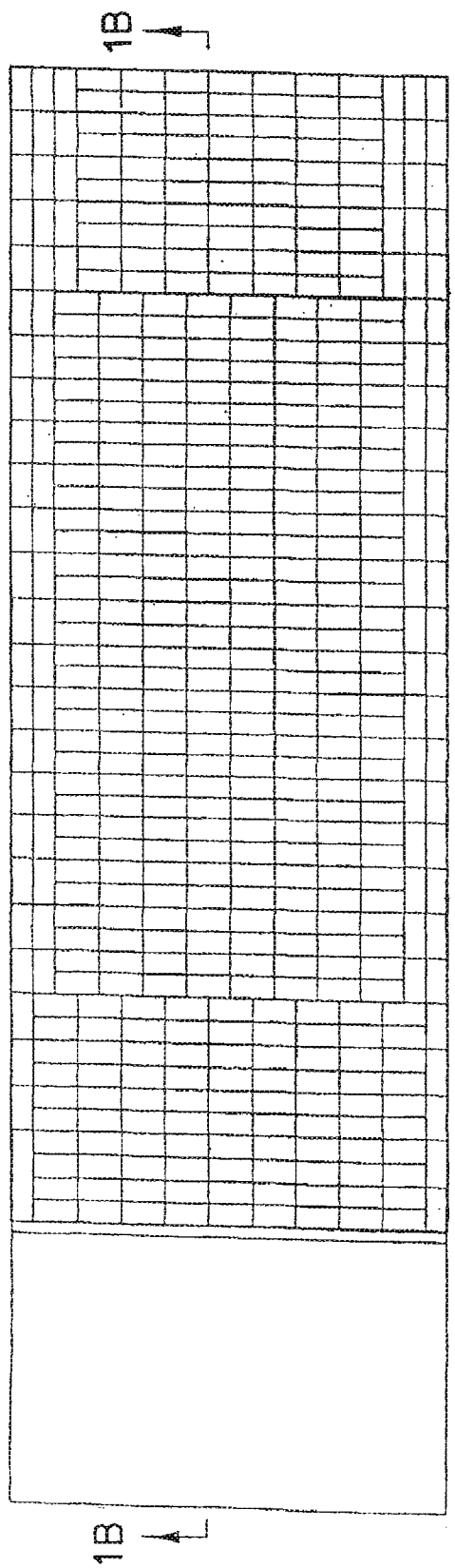
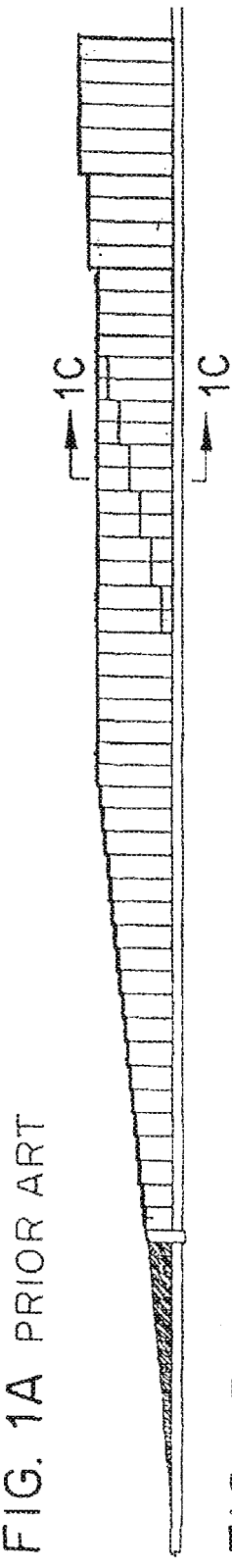
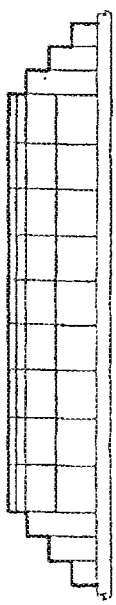
FIG. 1A PRIOR ART
FIG. 1B PRIOR ART
FIG. 1C PRIOR ART

CAPPED AND/OR BEVELED JET BLAST RESISTANT VEHICLE ARRESTING UNITS, BED AND METHODS

BACKGROUND OF THE INVENTION

This invention relates to arresting the forward motion of vehicles, such as (but not limited to) aircraft overrunning a runway, and more particularly to arresting embodiments with improved resistance to jet blast, moisture damage and other potentially destructive forces.

The problem of aircraft overrunning the ends of runways, with the possibility of passenger injury and aircraft damage, is discussed in U.S. Pat. No. 5,885,025, "VEHICLE ARRESTING BED SYSTEMS" (which may be referred to as "the '025 patent"). That patent, together with U.S. Pat. No. 5,902,068, "VEHICLE ARRESTING UNIT FABRICATION METHOD" (the '068 patent) and U.S. Pat. No. 5,789,681, "ARRESTING MATERIAL TEST APPARATUS AND METHODS" (the '681 patent) describe arresting beds, units and fabrication methods and testing based on application of, for example, cellular concrete for arresting purposes. Improved arresting blocks, beds and methods are described in U.S. Pat. No. 6,685,387, "JET BLAST RESISTANT VEHICLE ARRESTING BLOCKS, BEDS AND METHODS" (the '387 patent). The disclosures of the '025, '068, '681 and '387 patents are hereby incorporated herein by reference.

By way of example, FIGS. 1A, 1B and 1C provide top, side and end views of a vehicle arresting bed constructed of cellular concrete blocks for installation at the end of an airport runway. As more fully described in the '025 patent, an overrunning aircraft enters the bed via a sloped ramp and encounters an array of cellular concrete blocks of increasing height and compressive gradient strength. Such compressive gradient strengths and the bed geometry are predetermined to enable forward travel to be arrested, while minimizing the potential for passenger injury and aircraft damage. In these figures, vertical dimensions and individual block size are expanded for clarity. An actual arresting bed may, for example, have dimensions on the order of 150 feet in width, with a maximum height or thickness of 30 inches (or more if desired), and include thousands of blocks of four foot by four foot, four foot by eight foot or other suitable horizontal dimensions.

Arresting beds constructed pursuant to the above patents, with installations at major airports, have been shown to be effective in safely stopping aircraft under actual emergency overrun conditions. For example, the arresting of an overrunning airliner at JFK International Airport by an arresting bed fabricated by the assignee of the present invention, was reported in the *New York Times* of May 13, 1999. However, in some applications, depending in part upon particular airport layout, the proximity of jet blast or other physical forces may give rise to deteriorating or destructive effects which could limit the useful life of an arresting bed. Material used in an arresting bed must have limited strength to permit compressive failure of the material without destruction of the landing gear of an aircraft, for example. Thus, the requirement to limit the strength of compressible material used for arresting purposes, in turn may make the material susceptible to damage or destruction by sonic, pressure, vibrational, lift, projected gravel and other characteristics and effects of jet blast from nearby aircraft, as well as from other sources, such as objects making contact with, or people walking on, an arresting bed at times other than during actual arresting incidents. As to jet blast phenomena in particular, measured conditions at an end-of-runway arresting bed installation site have included wind velocities to 176 MPH and 150 dB or higher sonic levels. Compressible material, such as cellular concrete, may also be subject to deteriorating effects and shortening of useful life as a result of ground water intrusion, absorption of moisture resulting from rain or snow, thermocycling, acoustic vibrations, human traffic, other environmental causes, etc.

Accordingly, objects of the present invention are to provide arresting units and beds, and methods relating thereto, which are new or improved, or which may have one or more of the following characteristics and capabilities:

improved structural form without performance degradation;
improved resistance to some or all jet blast phenomena;
improved resistance to damage from pedestrian traffic;
improved durability in close proximity to aircraft operations;
improved resistance to ground water or atmospheric conditions;
simplified installation and replacement; and
improved structural integrity during shipment and installation.

SUMMARY OF THE INVENTION

In accordance with the invention, in one particular embodiment a vehicle arresting unit may include a block of compressible material (e.g., cellular concrete), intermediate material (e.g., a foam sheet) having a resiliency characteristic, a cap assembly and a bottom tray of plastic material configured to impede entry of ground surface moisture. Any such block may be a solid mass; alternatively, a block may comprise two or more layers or units of material adhered or otherwise fastened or connected together.

The cap assembly, if present, may include (i) a top tray of frangible material having a top portion positioned above the intermediate material and edge portions extending downward from the top portion and (ii) tray extensions (e.g., portions of a flexible fabric) extending from edge portions of the top tray and adhered (via hot-melt glue or otherwise) to side surfaces of the block. The top tray, which is fabricated to readily break during vehicle arrestment, may be made of molded plastic material with upper parts of flexible fabric tray extensions molded into the plastic material. The bottom tray, if present, may include a lower surface bordered by beveled edges configured to form water drainage channels when two of the vehicle arresting units are positioned side-by-side on a supporting surface to provide a vehicle arresting bed.

Also in accordance with the invention, in one embodiment a method of fabricating a vehicle arresting unit may include some or all of the following steps, which may be employed in any suitable order:

(a) fabricating a bottom tray having a lower surface bordered by beveled edges configured to form water drainage channels when two of such bottom trays are positioned side-by-side on a supporting surface; and (b) forming a block of compressible material by pouring predetermined material into a mold configuration including the bottom tray, to provide a vehicle arresting unit comprising the block with the bottom tray at the bottom of the block;

(c) fabricating a cap assembly including a top tray and tray extensions extending from edges of the top tray;

(d) positioning the top unit above the block of compressible material; and (e) adhering the tray extensions to side surfaces of the block of compressible material.

The method may further include, between steps (c) and (d) or otherwise, the step of:

(x) positioning intermediate material on top of the block of compressible material so that the intermediate material will be positioned between the top assembly and the top of the block, the intermediate material having a force transmission mitigation characteristic. In addition to such step (x) the method may include, between steps (x) and (d) or otherwise, the step of:

(y) positioning a section of sheet material (e.g., flexible fabric) below such bottom tray and adhering portions thereof to side surfaces of the vehicle arresting unit.

For a better understanding of the invention, together with other and further objects, reference is made to the accompanying drawings and the scope of the invention will be pointed out in the accompanying claims.

BRIEF DESCRIPTION OF THE DRAWINGS

FIGS. 1A, 1B and 1C are respectively a plan view, and longitudinal and transverse cross-section views, of a vehicle arresting bed.

DESCRIPTION OF THE INVENTION

Figure 2:
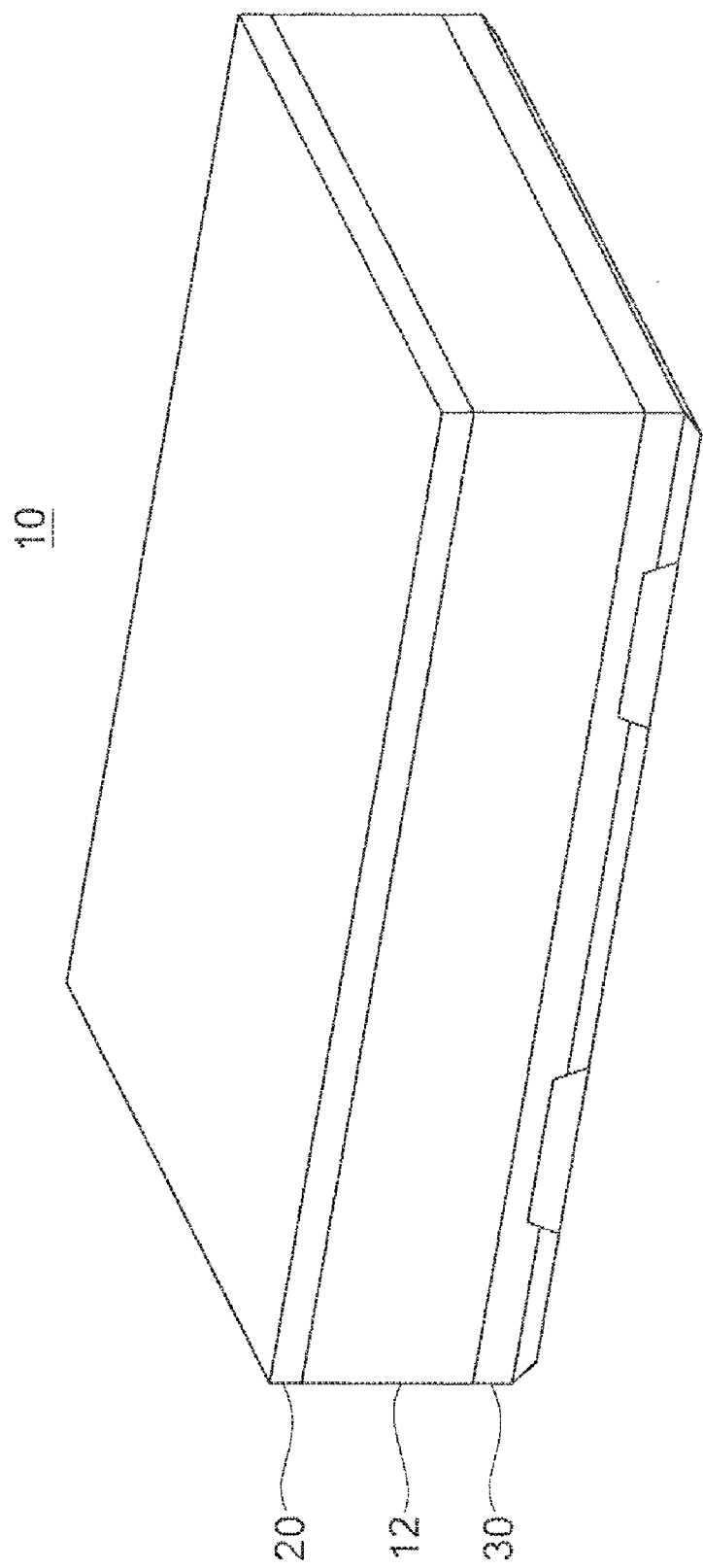
FIG. 2 is a three-dimensional type of view of an embodiment of a vehicle arresting unit in accordance with the invention.
Figure 3:
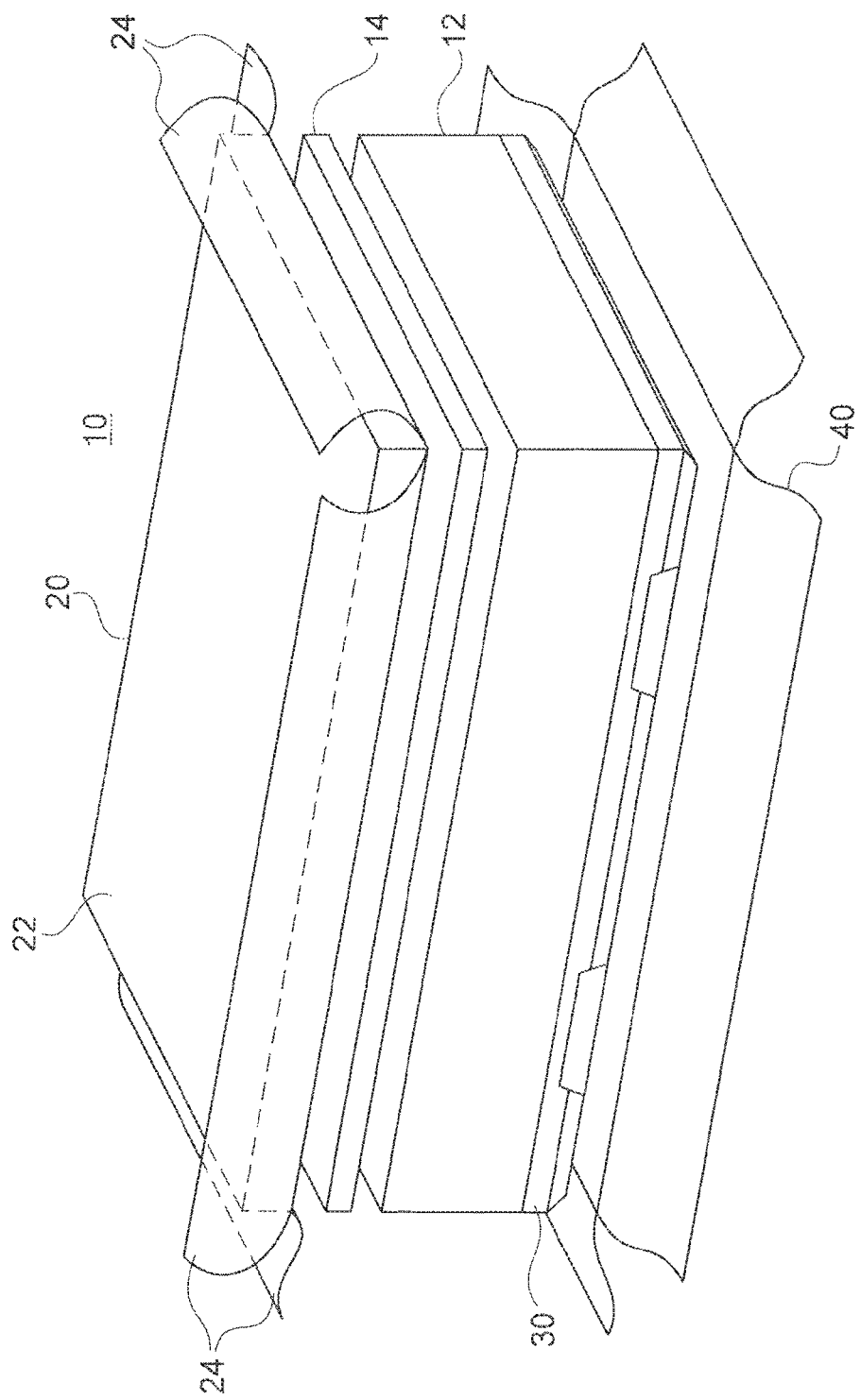
FIG. 3 is a vertically-separated view of elements of the FIG. 2 vehicle arresting unit.

FIG. 2 illustrates an embodiment of a vehicle arresting unit 10 pursuant to the invention. By way of example, this arresting unit may have horizontal dimensions of four feet by four feet and be six to thirty inches (or more) thick. FIG. 3 provides a vertically-separated view of elements of the FIG. 2 arresting unit. The drawings are not necessarily to scale; some dimensions may be altered for better visual presentation.

As shown, vehicle arresting unit 10 includes a block 12 of compressible (or otherwise deformable) material having top, bottom and side surfaces and a top to bottom thickness. Block 12 may be cellular concrete fabricated in accordance with the '068 patent or otherwise, or may be formed of phenolic, ceramic, foam glass or other suitable material. As described in the '025 patent, for vehicle (e.g., aircraft) arresting applications utilize arresting material having selected strength characteristics (e.g., strength during compressive failure) suitable to meet dual objectives of enabling aircraft travel to be arrested (i.e., forward motion stopped) within a desired distance, while also avoiding serious passenger injury or aircraft damage such as landing gear failure. Thus, an objective is to avoid "abrupt deceleration," which for present purposes is defined as deceleration at a rate exceeding 1.4 g (where 1 g represents 32 feet per second squared). For example, cellular concrete fabricated so as to provide a compressive gradient strength ranging between 60 to 80 psi (pounds per square inch) over a 60 to 80 percent penetration range has been found suitable for use in an arresting bed for aircraft arrestment. The term "arrestment" is defined as the process of decelerating and stopping forward motion of a vehicle, such as an aircraft. Fabrication and testing of cellular concrete for such applications is described in the '068 and '681 patents.

As visible in FIG. 3, in this embodiment vehicle arresting unit 10 includes intermediate material 14 positioned above the top surface of block 12. Intermediate material 14 may be a sheet or layer of foam material, such as closed-cell polyethylene foam, other plastic foam or other suitable material selected to provide a resiliency characteristic. To provide such characteristic, intermediate material 14 may typically have one or more of pliable, compressible or resilient properties. To reduce transmission of effects of external phenomena in the context of the combination of components comprising arresting unit 10, intermediate material 14 may be selected to provide a force transmission mitigation characteristic consistent with such resiliency characteristic. Suitable material and thickness can be specified by skilled persons in particular applications in view of the nature and severity of applicable phenomena (e.g., in view of the level of jet blast expected and proximity to an active runway in intended usage). For present purposes, the term "mitigation characteristic" is used consistent with the ordinary dictionary sense of "mitigate" of causing to become less harsh, hostile or severe, and may include one or more of spreading, dispensing, diluting, deflecting, dissipating, attenuating, absorbing, cushioning, or generally lessening destructive effects of noise, vibration, physical contact, etc. on a surface or layer below material having a force transmission mitigation characteristic.

In a presently preferred embodiment employing a cellular concrete block, one-quarter inch thick closed-cell polyethylene foam material is included for aircraft arresting bed applications. Such a foam sheet is thus considered to provide an adequate force mitigation characteristic suitable for a typical application. In other embodiments subject to different levels of external phenomena (e.g., higher or lower levels of jet blast phenomena) the intermediate material 14 may comprise a different type of plastic foam or other suitable material and may be thicker, thinner, include one or more layers or may be omitted. Thus, in some applications cap assembly 20 (to be described) may provide an adequate level of isolation of the block 12 from the external phenomena levels actually present, without inclusion of intermediate material 14. As will be further described, in FIG. 2 intermediate material 14 is covered by cap assembly 20 and is not visible.

Arresting unit 10, as illustrated, includes a cap assembly 20 positioned as the top element of the arresting unit. In this configuration, the arresting unit may be considered to be capped by the cap assembly 20. As will be further discussed, in installations in which an arresting bed is positioned in relatively close proximity to operating aircraft, jet blast phenomena and other external forces may have deleterious effects on compressible materials of limited strength suitable for arresting bed applications. Pursuant to the invention, cap assembly 20 in combination with other elements of arresting unit 10 provides increased protection from or resistance to such effects, or both.

Figure 4:
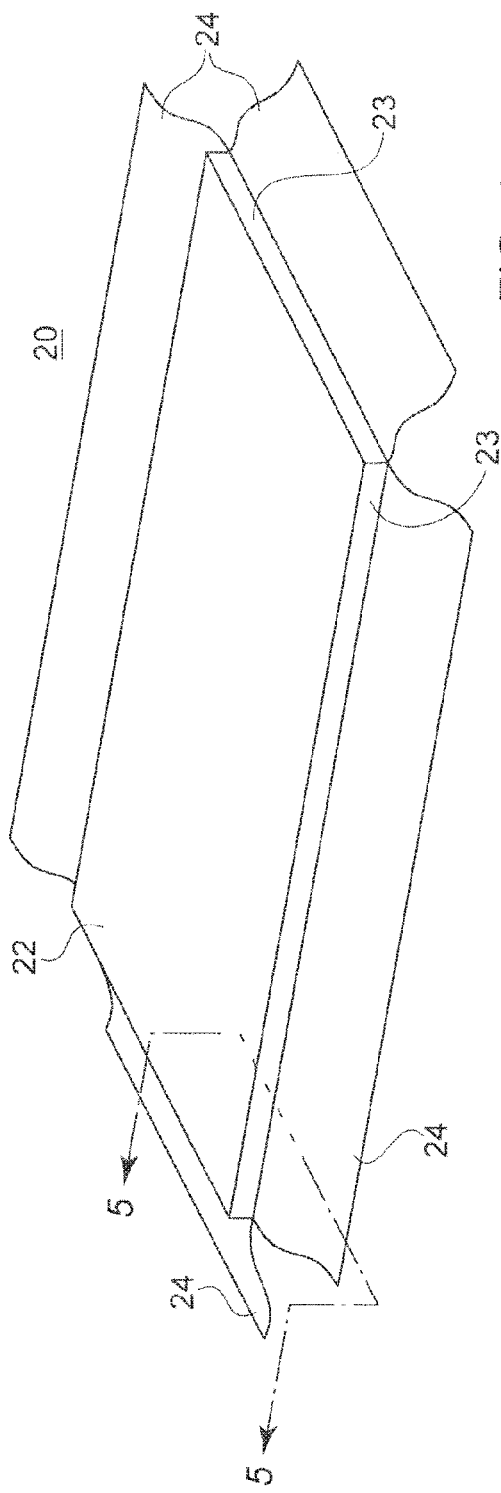
FIG. 4 shows the cap assembly of the vehicle arresting unit of FIGS. 2 and 3.
Figure 5:
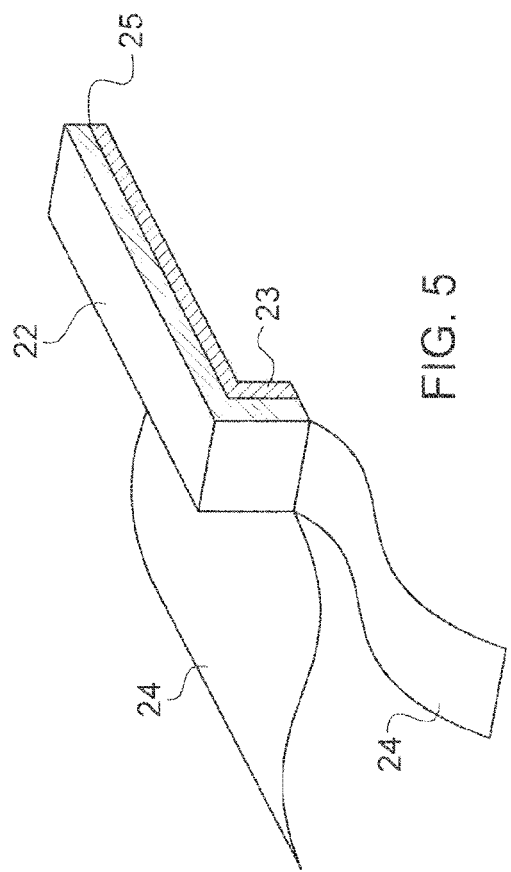
FIG. 5 is a partial sectional view of the cap assembly of FIG. 4.

FIG. 4 shows cap assembly 20 separately and FIG. 5 is a sectional view of a corner portion of cap assembly 20. Cap assembly 20 includes a top tray 22 and tray extensions 24, which may be portions of flexible fabric, such as a synthetic fabric or other suitable material, polyester scrim material, etc. As illustrated, top tray 22 has a flat top portion and edge portions 23 extending downward from the top portion. In a presently preferred embodiment, top tray 22 is fabricated of frangible material and has a strength to readily fracture when impacted during a vehicle arrestment, while being strong enough to provide to other elements of the arresting unit at other times a level of protection against environmental exposure and other external forces such as discussed above. Thus, in the absence of a different objective for a particular application, a general objective is to fabricate a cap assembly of components and materials such that the cap assembly has a breaking strength to readily break during vehicle arrestment without subverting the selected strength characteristics of the compressible material of block 12 as discussed above.

Consistent with the configuration illustrated in FIG. 5, top tray 22 may be molded of suitable thermoset or other material, with application of molding techniques available to skilled persons, or otherwise suitably fabricated. As represented in FIG. 5, in a presently preferred embodiment the tray extensions may be provided by use of flexible fabric which may comprise one or more central portions with the tray extensions 24 extending therefrom and visible in FIGS. 4 and 5. With this configuration, the central portion or portions may be introduced into a suitable molding process so that each central portion is molded into the frangible material of the top tray 22 (for example, molded into the flat top portion, as indicated in FIG. 5 at 25, as well as into the downward extending edge portions 23) with the tray extensions 24 extending from the lower edge of the edge portions 23, in the manner illustrated. For this embodiment the top tray may be molded of polyester plastic material, for example, with flexible fabric consisting of one or more sections of any appropriate form of material, such as netting or other appropriate type of open weave or scrim type of fabric suitable for use in a molding process as described. In other embodiments, the top tray may be formed of any suitable material as determined by skilled persons. The flexible fabric may be formed of polyester or other suitable material of a strength and construction configured to readily rip, tear or otherwise break during a vehicle arrestment, while being strong enough to provide a level of strength to aid in holding the elements of arresting unit in position relative to each other, at other times. In other embodiments tray extensions 24 may be provided in forms and shapes suitable for particular applications, may comprise other materials (e.g., sheet material such as fabric, plastic or metal, etc., solid or perforated, etc.) suitable for particular applications and may be attached to top tray 22 in any suitable manner, as may be determined by skilled persons having an understanding of the invention.

In the FIG. 2 configuration the tray extensions 24 may be glued or otherwise adhered to sides of the arresting unit, as will be further described. In the separated view of FIG. 3, for purposes of illustration the tray extensions 24 are shown extending outward from the edge portions of top tray 22 of cap assembly 20. FIG. 2 represents a finished form of arresting unit 10 with tray extensions 24 adhered to the sides of the arresting unit. For purposes of clarity of presentation the tray extensions 24 are represented as being transparent in FIG. 2.

In an exemplary embodiment, the top portion of top tray 22 may have a thickness (e.g., as shown in cross-section in FIG. 5) of nominally one-eighth inch and the edge portions 23 may have a thickness of nominally one-tenth inch and a vertical dimension of at least one-half inch. In other embodiments such dimensions may be different, as determined to be suitable for particular applications. For present purposes, the term "nominal" or "nominally" is used to identify a value or dimension within plus or minus fifteen percent of a stated reference value, dimension or range. The word "frangible" is used in its ordinary dictionary sense of being breakable or shatterable without necessarily implying weakness or delicacy. In some implementations, a vehicle arresting unit may omit a cap assembly, intermediate material, or both, and utilize one or more of a flat top protective sheet, flexible sheeting, a water resistant coating, some other suitable top element or none of these, in view of the composition of the block 12, the particular conditions of use, etc.

Figure 6:
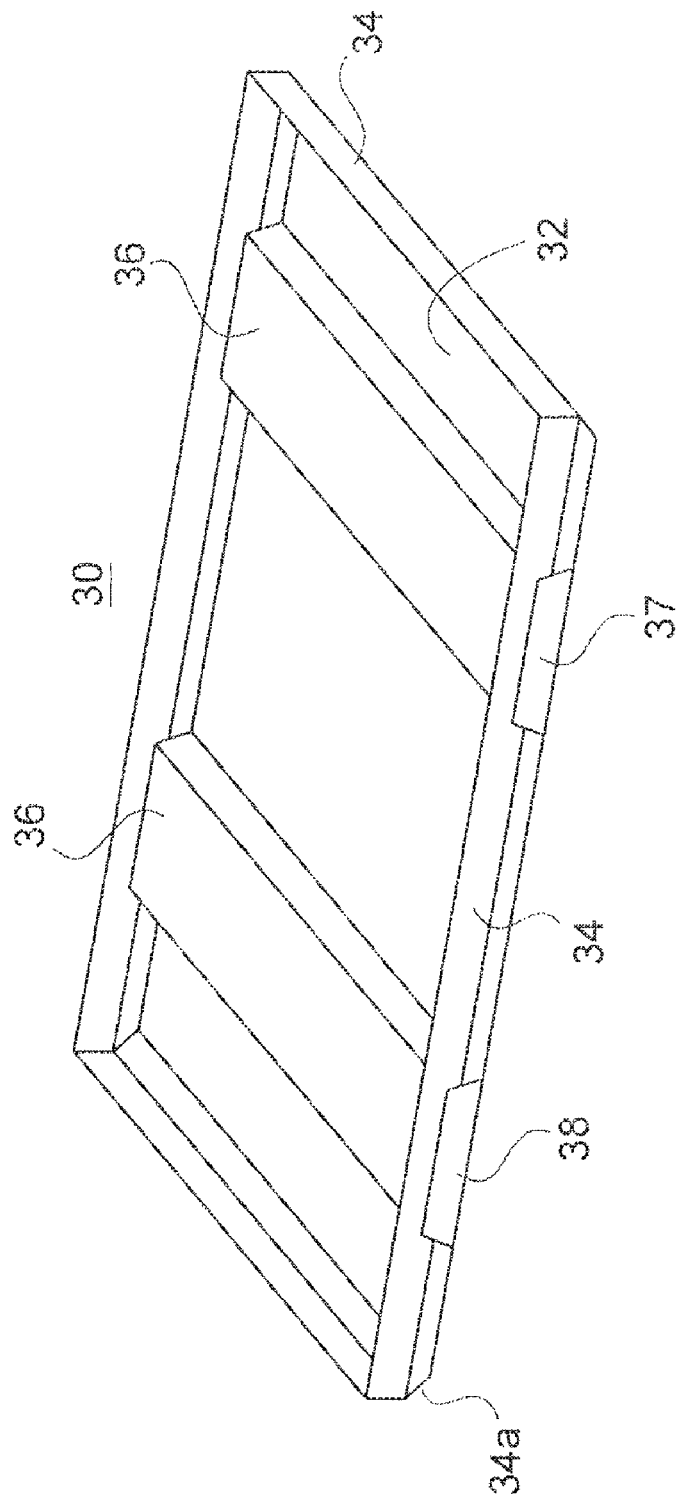
FIG. 6 shows the bottom tray of the vehicle arresting unit of FIGS. 2 and 3.

As illustrated, arresting unit 10 of FIGS. 2 and 3 further includes a bottom tray 30 positioned as the bottom element of the vehicle arresting unit. FIG. 6 shows bottom tray 30 separately. As shown, the bottom tray has a bottom portion 32 (positioned below the bottom surface of block 12 and therefore not visible in FIGS. 2 and 3) and edge portions 34 extending upward from the bottom portion 32. With this arrangement the bottom tray is configured to impede entry of ground surface moisture into the block 12.

Additional features of bottom tray 30, as illustrated in this embodiment, include the following. As shown, the lower surface of bottom tray 30 is bordered (e.g., on all four sides) by beveled edges 34a, which may be considered to comprise the lower portions of the edge portions 34. thus, the edge portions 34 are configured to provide the beveled edges 34a. The beveled edges (e.g., beveled at 45° or other suitable angle) are configured to form water drainage channels—especially when two of the vehicle arresting units 10 are placed side-by-side on a supporting surface. This will be described further with reference to FIG. 7. As shown in FIG. 6, bottom portion 32 of the bottom tray includes raised channel portions 36 which are dimensioned and shaped to enable insertion of the lifting prongs of a common form of fork lift (e.g., fork lift truck) to facilitate lifting and placement of the arresting unit 10. In this embodiment there are also included flat cover sections 38 arranged to extend across the lower access to the channels 36 which would otherwise be open across the bottom extent thereof. In this configuration, cover sections 38 may, for example, be molded in place or formed of flat sections of suitable plastic or other material which are bonded, glued, heat welded or otherwise fastened to the bottom surface of the bottom tray 30 so as to cover upward access to the channels 36, while permitting lateral access (e.g., by fork lift prongs).

In a presently preferred embodiment, the bottom tray 30 may be molded of plastic material (e.g. thermoplastic polystyrene material). Bottom portion 32 and edge portions 34 may have a thickness of nominally one-tenth inch and edge portions 34 may have a height of at least one inch upward from the bottom portion (e.g., including the height of the lower beveled portion 34a). In other embodiments any and all dimensions may be altered as may be determined by skilled persons to be appropriate in view of particular conditions and objectives regarding specific applications. In some embodiments, a vehicle arresting unit may omit a bottom tray and utilize one or more of a flat bottom, flexible sheeting, a water resistant coating, some other suitable bottom element, or none of these, in view of the composition of block 12, the particular conditions of use, etc.

As visible in FIG. 3, in the illustrated embodiment vehicle arresting unit 10 may further include a section (e.g., one or more sections) of sheet material having a central part positioned below bottom tray 30 and having upward extending parts which, in FIG. 2, are adhered to side surfaces of block 12. As shown in FIG. 3, sheet material section 40 has a central part and four outward extending parts, one on each side of the central part. In FIG. 2, sheet material section 40 is represented as being transparent for purposes of clarity of presentation of the complete arresting unit 10. However, it will be understood that in FIG. 2 the central part of section 40 has been brought up against the bottom surface of bottom tray 30 and the extending parts of which were outward extending in FIG. 3 have now been made to extend upward and have been adhered (by adhesive or in any suitable manner) to the side surfaces of block 12. The upward extending parts of sheet material section 40 may be adhered to the sides of block 12 directly or indirectly (e.g., positioned beneath or over the tray extensions 24 of flexible fabric which are discussed above). For present purposes, "adhered to side surfaces" and similar phrases are defined as including adhered directly as well as indirectly (e.g., overlaying something directly adhered). With sheet material section 40 adhered to block 12 as described, the upward extending parts thereof may be provided with openings to facilitate fork lift prong access to the transverse or laterally extending slots formed between portions 36 and 38 (e.g., access as represented by arrow 37 in FIG. 6). Sheet material 40 may comprise a suitable fabric (e.g. netting, scrim, etc.) or other material such as plastic, metal, etc., perforated or unperforated, as may be determined by skilled persons to be suitable for particular applications. In a presently preferred embodiment sheet material 40 comprises flexible polyester scrim fabric.

Figure 7:
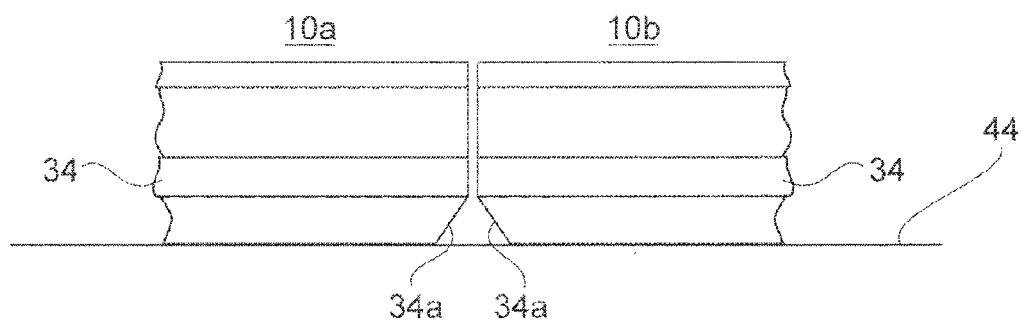
FIG. 7 shows portions of two vehicle arresting units, each of the form shown in FIG. 2, placed side by side on a supporting surface.

Referring now to FIG. 7, there are illustrated two vehicle arresting units positioned side-by-side on a supporting surface 44 (e.g., the surface of a runway end section or extension). As shown, a right portion of an arresting unit 10a is positioned next to a left portion of an arresting unit 10b, each of which may be in the form of unit 10 of FIG. 2. In a complete arresting bed, an example of which is shown in the plan view of FIG. 1A, pursuant to the present invention each side-by-side positioning of two blocks may be represented by the FIG. 7 configuration.

With this side-by-side arrangement, the beveled edges 34a (bordering the bottom surface of each arresting unit supported by surface 44) of adjacent vehicle arresting units 10a and 10b positioned in abutting arrangement, as shown, provide a water drainage channel along the supporting surface 44. Thus, in the FIG. 7 embodiment, the two adjacent beveled edges 34a of respective arresting units 10a and 10b are shown abutting (for example, spaced about one-half inch or more apart) and, in conjunction with the supporting surface 44, form a water drainage channel of triangular cross section and extending along the full length of the abutting sides of the units. In the context of a complete arresting bed (e.g., of the type shown in FIG. 1A) wherein arresting units are arranged in columns and rows, the beveled edges of the individual units may be arranged to provide water drainage channels on a continuous basis extending the width or length of the arresting bed, or both. Also, the fork lift prong channels (e.g., raised channel portion 36 providing access as at 37 of FIG. 6) and spacing between arresting units may aid in removal of water and moisture as to each individual arresting unit, by providing access for drainage or air circulation via the water drainage channels formed by beveled edges 34a.

Figure 8:
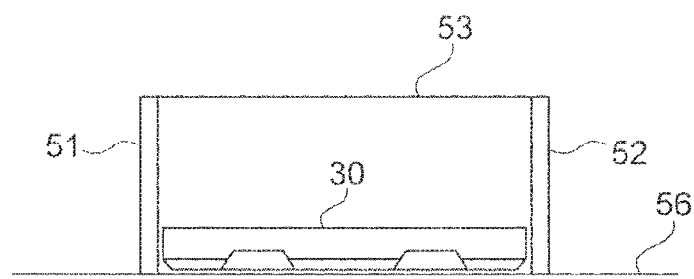
FIG. 8 illustrates a bottom tray as in FIG. 6 positioned within an open-bottom mold prior to introduction of block material in liquid form.

With respect to methods of fabricating vehicle arresting units, FIG. 8 is a simplified side view representation of a four-sided mold or form configuration including left side 51, right side 52 and far side 53, with the near side removed to enable viewing of the placement of a bottom tray 30 (e.g., as shown in FIG. 6) within the mold. As shown, the mold has neither a top nor a bottom and both the mold and the bottom tray 30 rest upon a supporting surface 56. This mold configuration, or suitable alternatives as may be determined by skilled persons, may be employed in methods of fabricating vehicle arresting units, as will be described.

As applicable to arresting beds installed at airports, relevant external phenomena comprise jet blast phenomena, which may include sonic, vibrational, pressure, lift, erosive (e.g., by airborne gravel) and other characteristics and effects, as well as compressive and other forces resulting from persons or objects making contact with an arresting bed other than during actual arresting incidents. Described components of the arresting unit 10 may be selected to reduce or mitigate effects of such external phenomena on block 12 (e.g., provide a level of protection to block 12 relative to external phenomena incident on cap assembly 20) and thereby provide a force transmission mitigation characteristic as described above, to enhance arresting unit resistance to such phenomena. At the same time, the components and the composite arresting unit itself must not be so strong or force resistant as to subvert the basic required parameters of energy absorption via compressive failure of the block of compressible material with desired characteristics upon contact by the wheel of an aircraft overrunning a runway. Thus, for example, the cap assembly should be readily breakable upon contact by a vehicle wheel during arrestment, so as not to significantly alter the selected strength characteristics available by use of the block of compressible material, as discussed above. Arresting units as described thus provide intended compressive failure of arresting units with predetermined failure characteristics when arresting a vehicle, while providing improved resistance to deleterious effects of external phenomena in the period prior to occurrence of an arrestment.

Figure 9:
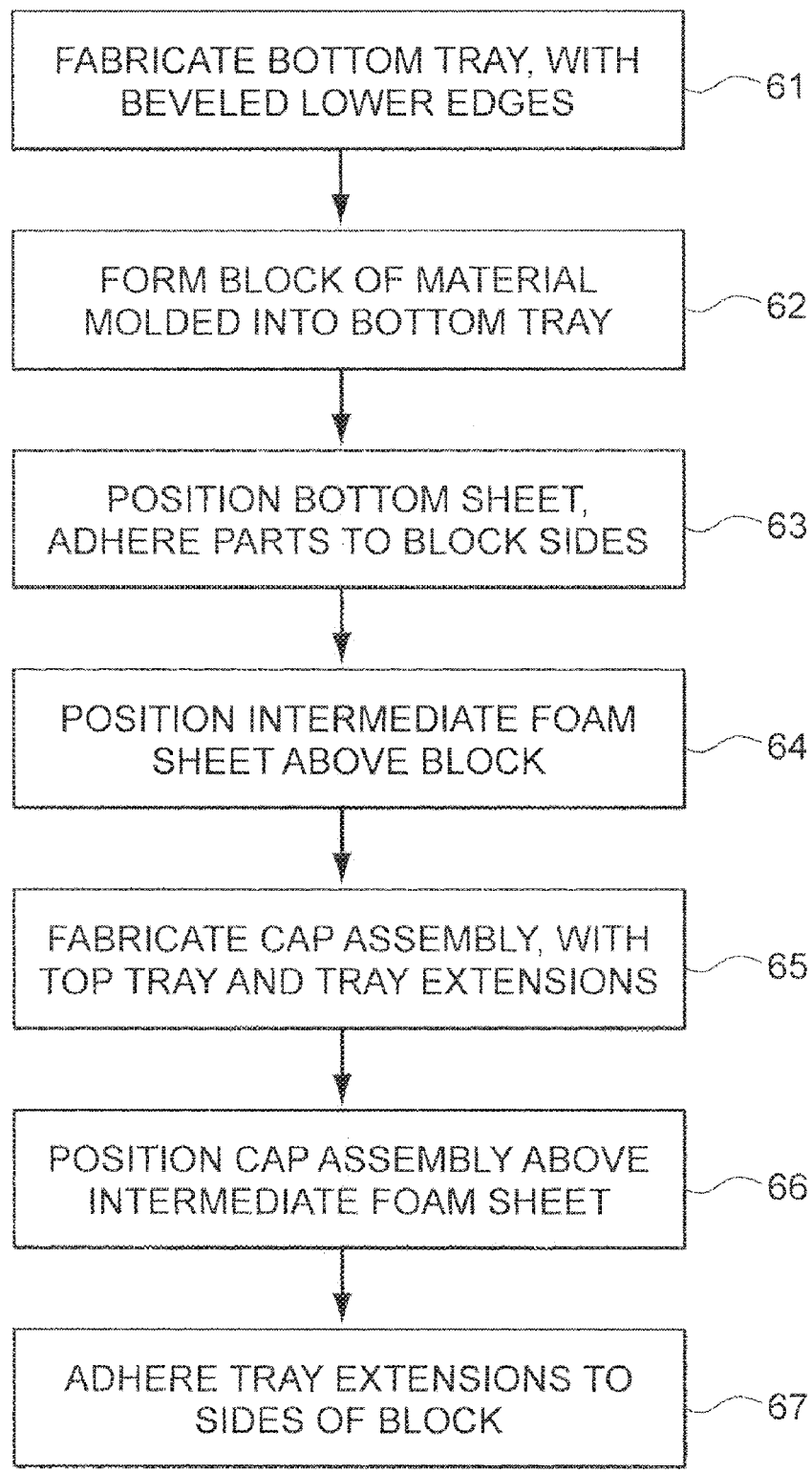
FIG. 9 is a flow chart useful in describing one method of fabricating a vehicle arresting unit in accordance with the invention.

FIG. 9 is a flow chart useful in describing an example of a method utilizing the invention.

At 61, a bottom tray (e.g., bottom tray 30 of FIG. 6) is fabricated. As described, bottom tray 30 has a lower surface bordered by beveled edges configured to form water drainage channels when two bottom trays are positioned side-by-side on a supporting surface. Bottom tray 30 may include upward extending edge portions and be configured to protect block 12 from ground water and moisture absorption effects. Transverse access slots for access by fork lift prongs may also be provided, as previously described.

At 62, a block 12 of compressible material having characteristics appropriate for a vehicle arresting application is provided. As noted, the block may comprise cellular concrete having an appropriate compressive gradient strength as described in the '068 patent or other suitable material, such as phenolic, ceramic, foam glass, etc. For aircraft arresting bed applications the block may typically have dimensions of approximately four feet by four feet by six to 30 inches in thickness. In this embodiment block 12 may be formed by pouring suitable material into a mold configuration (e.g., as described with reference to FIG. 8) including the bottom tray 30, to provide block 12 with tray 30 below the bottom surface of the block. In this arrangement, in addition to conforming to the bottom surface of the block, the upward extending edge portions of tray 30 provide additional protection against damage and moisture exposure to the lower part of block 12.

At 63, a section of sheet material (e.g., flexible fabric section 40 of FIG. 3) is positioned below bottom tray 30. In this embodiment, parts of the sheet material section 40 which extend out from under bottom tray 30 are then brought upward and adhered to side surfaces of the block 12 and thereby side surfaces of the arresting unit 10. In this regard, it will be appreciated that the upward extending parts of sheet material section 40 may be adhered directly to the sides of block 12 or indirectly by adherence over previously adhered tray extensions 24 extending downward from top tray 22, depending upon whether the respective upper or lower fabric portions are adhered first, as may be determined by skilled persons in particular implementations of the invention. To provide adherence of the upward extending parts of the sheet material section 40, suitable adhesives or other materials, as may be determined as appropriate in particular implementations, may be employed. When the outward extending parts of the sheet material section 40 are brought upward they may cover the access openings (e.g., 37 in FIG. 6) for fork lift prongs, unless suitable openings in the sheet material have previously been provided. Alternatively, suitable openings through the sheet material parts can be provided after they are brought into position and thereby cover the access openings 37. For clarity of presentation, sheet material section 40 may be depicted as being transparent in certain views (e.g., FIG. 2). However, a variety of forms and type of fabric may be employed, as determined to be appropriate by skilled persons. In some implementations it may be determined to be appropriate to omit the bottom fabric section and place reliance on other components of the arresting unit as adequate to maintain arresting unit integrity. With inclusion of bottom fabric section 40, increased positional stability and adherability of an arresting unit to a supporting surface may be provided.

At 64, intermediate material 14 is positioned above the top surface of block 12. Intermediate material 14 may comprise a layer of closed-cell or other foam or other material providing a desired force transmission mitigation characteristic with respect to external phenomena. Such material may or may not have energy absorption properties, depending upon the particular material selected and may have a thickness up to one-half inch or more. In a currently preferred embodiment intermediate material 14 is provided in the form of a sheet of polyethylene foam of approximately one-quarter inch thickness. In some embodiments intermediate material 16 may be omitted (e.g., in view of a low expected severity of external phenomena).

At 65, a cap assembly (e.g., cap assembly 20 of FIG. 4) is fabricated. As described, cap assembly 20 may include a top tray 22 molded of thermoplastic material and tray extensions 24 of flexible fabric or other material extending from edges to the top tray. As described with reference to FIG. 5, in one embodiment top tray 22 may have upper portions of tray extensions comprising flexible fabric molded into the plastic material during molding, as represented at 25. In a currently preferred embodiment, top tray 22 is formed of a plastic material having properties to enable it to readily break (e.g., fracture) during an aircraft arrestment. This enables cap assembly 20 to initially protect block 12 from incidental damage, but to break upon contact by an aircraft wheel during an arrestment without being strong enough to materially alter the overall energy absorption characteristics provided during compressive failure of block 12.

At 66, a cap assembly (e.g., cap assembly 20 as previously fabricated) is positioned above the intermediate material (e.g., intermediate material 14 in this embodiment) which has been positioned above the top surface of block 12. As represented in FIG. 2, with cap assembly 20 in position at the top of arresting unit 10, the edge portions of the cap assembly may extend downward far enough to cover the intermediate material 14 (e.g., as shown in FIG. 3) so that the edges of the intermediate material are not visible in the completed arresting unit shown in FIG. 2.

At 67, the tray extensions (e.g., portions 24 visible in FIG. 3) are adhered to side surfaces of the block 12 and thereby side surfaces of the arresting unit 10. As described with reference to the bottom section of sheet material 40, adherence may be directly to sides of block 12 or indirectly via adherence overlaying the parts of the sheet material 40, depending on the order of adherence as determined in specific embodiments. To provide adherence of the tray extensions 24 suitable adhesives or other materials may be used as determined as appropriate in particular implementations. With side adherence of the tray extensions 24 (shown transparent in FIG. 2) in a presently preferred embodiment it has been determined that positioning of cap assembly 20 and integrity of the complete arresting unit 10 is adequately maintained under typical conditions after installation of arresting units to form an arresting bed. In specific implementations additional or different arrangements may be provide by skilled persons for integrity of installation or other purposes.

Figure 10:
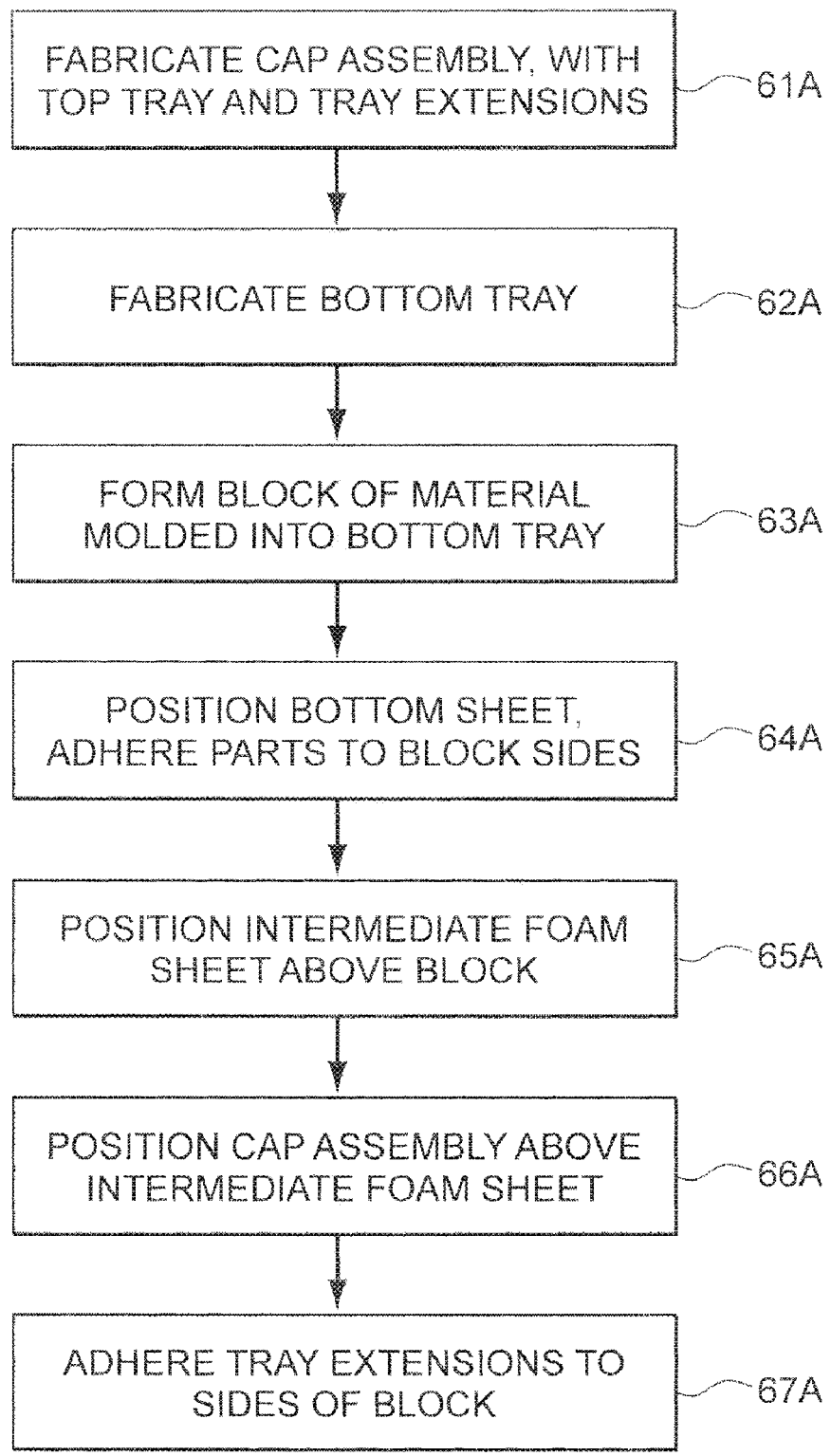
FIG. 10 is a flow chart useful in describing another method of fabricating a vehicle arresting unit in accordance with the invention.

FIG. 10 is a flow chart useful in describing another example of a method utilizing the invention.

At 61A, a cap assembly (e.g., cap assembly 20 of FIG. 4) is fabricated. As described, cap assembly 20 may include a top tray 22 molded of thermoplastic material and tray extensions 24 of flexible fabric or other material extending from edges to the top tray. As described with reference to FIG. 5, in one embodiment top tray 22 may have upper portions of tray extensions comprising flexible fabric molded into the plastic material during molding, as represented at 25. In a currently preferred embodiment, top tray 22 is formed of a frangible plastic material (including glass fibers) having properties to enable it to readily break (e.g., fracture) during an aircraft arrestment. This enables cap assembly 20 to initially protect block 12 from incidental damage, but to break upon contact by an aircraft wheel during an arrestment without being strong enough to materially alter the overall energy absorption characteristics provided during compressive failure of block 12.

At 62A, a bottom tray (e.g., bottom tray 30 of FIG. 6) is fabricated. As described, bottom tray 30 may include upward extending edge portions with beveled lower edges and be configured to protect block 12 from ground water and moisture absorption effects. Transverse access slots for access by fork lift prongs may also be provided, as previously described.

At 63A, a block 12 of compressible material having characteristics appropriate for a vehicle arresting application is provided. As noted, the block may comprise cellular concrete having an appropriate compressive gradient strength as described in the '068 patent or other suitable material, such as phenolic, ceramic, foam glass, etc. For aircraft arresting bed applications the block may typically have dimensions of approximately four feet by four feet by five to 30 inches (or more) in thickness. In this embodiment block 12 may be formed by pouring suitable material into a mold configuration (e.g. as described with reference to FIG. 8) including the bottom tray 30, to provide block 12 with tray 30 below the bottom surface of the block. In this arrangement, in addition to conforming to the bottom surface of the block, the upward extending edge portions of tray 30 provide additional protection against damage and moisture exposure to the lower part of block 12.

At 64A, a section of sheet material (e.g., flexible fabric section 40 of FIG. 3) is positioned below bottom tray 30. In this embodiment, parts of the sheet material section 40 which extend out from under bottom tray 30 are then brought upward and adhered to side surfaces of the block 12 and thereby side surfaces of the arresting unit 10. In this regard, it will be appreciated that the upward extending parts of sheet material section 40 may be adhered directly to the sides of block 12 or indirectly by adherence over previously adhered tray extensions 24 extending downward from top tray 22, depending upon whether the respective upper or lower fabric portions are adhered first, as may be determined by skilled persons in particular implementations of the invention. To provide adherence of the upward extending parts of the sheet material section 40, suitable adhesives or other materials, as may be determined as appropriate in particular implementations, may be employed. When the outward extending parts of the sheet material section 40 are brought upward they may cover the access openings (e.g., 37 in FIG. 6) for fork lift prongs, unless suitable openings in the sheet material have previously been provided. Alternatively, suitable openings through the sheet material parts can be provided after they are brought into position and thereby cover access openings 37. For clarity of presentation, sheet material section 40 may be depicted as being transparent in certain views (e.g., FIG. 2). However, a variety of forms and types of fabric may be employed, as determined to be appropriate by skilled persons. In some implementations it may be determined to be appropriate to omit the bottom fabric section and place reliance on other components of the arresting unit as adequate to maintain arresting unit integrity. With inclusion of bottom fabric section 40, increased positional stability and adherability of an arresting unit to a supporting surface may be provided.

At 65A, intermediate material 14 is positioned above the top surface of block 12. Intermediate material 14 may comprise a layer of closed-cell or other foam or other material providing a desired force transmission mitigation characteristic with respect to external phenomena. Such material may or may not have energy absorption properties, depending upon the particular material selected and may have a thickness up to one-half inch or more. In a currently preferred embodiment intermediate material 14 is provided in the form of a sheet of polyethylene foam of approximately one-quarter inch thickness. In some embodiments intermediate material 16 may be omitted (e.g., in view of a low expected severity of external phenomena).

At 66A, a cap assembly (e.g., cap assembly 20 as previously fabricated) is positioned above the intermediate material (e.g., intermediate material 14 in this embodiment) which has been positioned above the top surface of block 12. As represented in FIG. 2, with cap assembly 20 in position at the top of arresting unit 10, the edge portions of the cap assembly may extend downward far enough to cover the intermediate material 14 (e.g., as shown in FIG. 3) so that the edges of the intermediate material are not visible in the completed arresting unit shown in FIG. 2.

At 67A, the tray extensions (e.g., portions 24 visible in FIG. 3) are adhered to side surfaces of the block 12 and thereby side surfaces of the arresting unit 10. As described with reference to the bottom section of sheet material 40, adherence may be directly to sides of block 12 or indirectly via adherence overlaying the parts of the sheet material 40, depending on the order of adherence as determined in specific embodiments. To provide adherence of the tray extensions 24 suitable adhesives or other materials may be used as determined as appropriate in particular implementations. With side adherence of the tray extensions 24 (shown transparent in FIG. 2) in a presently preferred embodiment it has been determined that positioning of cap assembly 20 and integrity of the complete arresting unit 10 is adequately maintained under typical conditions after installation of arresting units to form an arresting bed. In specific implementations additional or different arrangements may be provided by skilled persons for integrity of installation or other purposes.

If desired, a sealant may be applied to the arresting unit 10 (e.g., to side surfaces as selected) to provide a water resistant characteristic. For example, polyurethane or epoxy coatings, or both, may be determined to be appropriate for this purpose, however other suitable materials may be employed and may provide both water resistance and some degree of additional resistance to external phenomena, such as ultraviolet radiation.

With an understanding of the invention, it will be apparent to skilled persons that steps of methods pursuant to the invention may be modified, varied as to order, omitted or supplemented by additional or different steps, or combinations of the foregoing. Also, in particular implementations of arresting units one or more of the described components may be omitted (e.g., cap assembly, intermediate material, bottom fabric section, etc.) changed or supplemented as may be determined to be appropriate by skilled persons, consistent with the invention. Skilled persons will be enabled to select suitable materials, methods and configurations as appropriate for particular applications and operating conditions. For example, it may be desirable to further glue or adhere together other components of the arresting unit.

While there have been described the currently preferred embodiments of the invention, those skilled in the art will recognize that other and further modifications may be made without departing from the invention and it is intended to claim all modifications and variations as fall within the scope of the invention.

What is claimed is:

1. A vehicle arresting unit, usable for arrestment of a vehicle, comprising:
    a block of compressible material having top, bottom and side surfaces;
    intermediate material, having a resiliency characteristic, positioned above said top surface;
    a cap assembly including (i) a top tray of frangible material having a top portion positioned above said intermediate material and edge portions extending downward from the top portion and (ii) tray extensions extending from edge portions of said top tray, the top tray fabricated to readily break during arrestment of said vehicle; and
    a bottom tray of water impervious material having a bottom portion positioned below the bottom surface of said block and edge portions extending upward from the bottom portion, the bottom tray (i) configured to impede entry of ground surface moisture and (ii) including a lower surface bordered by beveled edges, said beveled edges forming water drainage channels when two of said vehicle arresting units are positioned side-by-side on a supporting surface.

2. A vehicle arresting bed, comprising:
    a plurality of vehicle arresting units, each in accordance with claim 1, arranged on a supporting surface with said beveled edges of adjacent vehicle arresting units abutting to provide water drainage channels along the supporting surface.

3. A vehicle arresting unit as in claim 1, wherein said tray extensions comprise sections of flexible fabric, upper parts of which are molded into the frangible material of said top tray.

4. A vehicle arresting unit as in claim 1, wherein the top tray comprises molded plastic material fabricated to readily fracture when contacted by a tire during arrestment of said vehicle.

5. A vehicle arresting unit as in claim 1, further comprising:
    a section of sheet material having a central part below said bottom tray and upward extending parts adhered to side surfaces of said block.

6. A vehicle arresting unit as in claim 1, wherein said bottom tray is shaped to provide transverse channels suitable to accept fork lift prongs.

* * * * *